(12) United States Patent
Schmehl et al.

(10) Patent No.: US 12,543,768 B2
(45) Date of Patent: Feb. 10, 2026

(54) COFFEE ROASTING SYSTEM WITH ROASTING AND COOLING SUBSYSTEMS, AND METHODS FOR THE SAME

(71) Applicant: Bellwether Coffee Co., Berkeley, CA (US)

(72) Inventors: Stewart Schmehl, Pinehurst, NC (US); Peter Schmehl, Berkeley, CA (US)

(73) Assignee: Bellwether Coffee Co., Berkeley, CA (US)

( * ) Notice: Subject to any disclaimer, the term of this patent is extended or adjusted under 35 U.S.C. 154(b) by 949 days.

(21) Appl. No.: 17/391,581

(22) Filed: Aug. 2, 2021

(65) Prior Publication Data

US 2023/0031128 A1 Feb. 2, 2023

(51) Int. Cl.
*A23N 12/08* (2006.01)
*A23N 12/12* (2006.01)

(52) U.S. Cl.
CPC ......... *A23N 12/086* (2013.01); *A23N 12/125* (2013.01)

(58) Field of Classification Search
None
See application file for complete search history.

(56) References Cited

U.S. PATENT DOCUMENTS

| | | | |
|---|---|---|---|
| 2,089,663 A * | 8/1937 | Richeson | A23N 12/10 236/102 |
| 3,595,668 A * | 7/1971 | Nutting et al. | A23F 5/046 426/468 |
| 4,642,906 A * | 2/1987 | Kaatze | A23N 12/08 34/168 |
| 4,875,904 A * | 10/1989 | Munk | A23N 12/08 34/67 |
| 7,285,300 B1 * | 10/2007 | Allington | A23N 12/08 426/523 |
| 11,510,432 B2 | 11/2022 | Sandhu et al. | |
| 2006/0283337 A1 * | 12/2006 | Kato | A23N 12/10 99/477 |
| 2013/0344207 A1 * | 12/2013 | Ludwig | A23N 12/10 426/233 |

(Continued)

FOREIGN PATENT DOCUMENTS

| | | | | |
|---|---|---|---|---|
| CA | 2267608 A1 * | 9/2000 | | A23F 5/04 |
| JP | 4355105 B2 * | 10/2009 | | A23N 12/125 |

(Continued)

OTHER PUBLICATIONS

International Search Report and Written Opinion for Application No. PCT/US2022/039144, mailed on Nov. 28, 2022, 34 pages.

*Primary Examiner* — Thor S Campbell
(74) *Attorney, Agent, or Firm* — COOLEY LLP (57) ABSTRACT

A bean roasting system includes a roasting subsystem and an air handling subsystem. The roasting subsystem is configured to receive and to thermally roast a batch of beans. The air handling subsystem is coupled to the roasting subsystem and includes a blower, a cyclone separator, and a heater. The blower is configured to impart air motion. The air passes through the air handling subsystem. The cyclone separator is configured to remove particulates from the air handling subsystem. The heater is configured to heat the air passing through the air handling subsystem. The heater includes heater windings that are incorporated into the cyclone separator.

20 Claims, 7 Drawing Sheets

(56) References Cited

U.S. PATENT DOCUMENTS

| | | |
|---|---|---|
| 2018/0295870 A1 | 10/2018 | Lopez et al. |
| 2019/0208798 A1 | 7/2019 | Voges et al. |
| 2019/0320702 A1* | 10/2019 | Sandhu ............... A23F 5/04 |
| 2019/0320703 A1 | 10/2019 | Sandhu et al. |
| 2019/0350247 A1 | 11/2019 | Lopez et al. |
| 2019/0373940 A1* | 12/2019 | Voges ............ B65B 69/0041 |
| 2020/0288765 A1 | 9/2020 | Lopez et al. |
| 2021/0227871 A1 | 7/2021 | Sandhu et al. |
| 2021/0386108 A1 | 12/2021 | Lopez et al. |

FOREIGN PATENT DOCUMENTS

| | | | |
|---|---|---|---|
| WO | WO-9831974 A1 * | 7/1998 | ............ A23F 5/046 |
| WO | WO-2023014698 A1 | 2/2023 | |

* cited by examiner

COFFEE ROASTING SYSTEM WITH ROASTING AND COOLING SUBSYSTEMS, AND METHODS FOR THE SAME

FIELD OF THE DISCLOSURE

The present disclosure pertains to the roasting of food products, for example beans, such as coffee beans. In one or more embodiments the present disclosure describes a roasting system having a compact and thermally efficient heating system.

BACKGROUND

Food roasting machines are in wide use. One particularly common roasting machine is utilized to prepare coffee beans to be either packaged or ground and brewed. A typical roasting machine includes a roasting chamber for supporting, agitating, and roasting beans. One challenge is to provide a highly productive and yet compact roasting system. A heater is used to provide a roasting temperature profile inside of the roasting chamber. Known heaters involve bulky insulation or give off an undesirable amount of excess heat.

BRIEF DESCRIPTION OF THE FIGURES

FIG. 1 is a schematic diagram of an embodiment of a roasting system for processing a batch of coffee beans. FIG. 1 illustrates connections between elements that are either fluidic connections or concern a physical transfer of a batch of beans.

FIG. 2 is a simplified electrical block diagram for the roasting system of FIG. 1. FIG. 2 illustrates electrical or wireless connections between elements including a controller.

SUMMARY

In a first aspect of the disclosure, a bean roasting system includes a roasting subsystem and an air handling subsystem. The roasting subsystem is configured to receive and to thermally roast a batch of beans. The air handling subsystem is coupled to the roasting subsystem and includes a blower, a cyclone separator, and a heater. The blower is configured to impart air motion. The air passes through the air handling subsystem. The cyclone separator is configured to remove particulates from the air handling subsystem. The heater is configured to heat the air passing through the air handling subsystem. The heater includes a heater portion that is incorporated into the cyclone separator. The heater portion generates heat and heats air passing through the cyclone separator. The heater can generate heat and heat air based upon resistive heating through heater windings, ignition of a fuel such as natural gas, or generation of hot plasma to name some examples.

In one implementation the cyclone separator includes an air outlet, and air inlet, and a particulate outlet. The heater portion is incorporated into the air outlet. When the heater is based upon resistive heating, the heater portion can be or include heater windings that are incorporated into the air outlet.

In another implementation, the cyclone separator has a vertical cyclone axis that is central to a spiral rotation of particulates as they pass from an upper portion of the cyclone separator to the particulate outlet. The heater portion can include heater windings that surround the cyclone axis.

In yet another implementation, the cyclone separator includes a cyclone housing including an upper housing and a lower housing. The heater portion extends vertically from above the upper housing into the upper housing. The cyclone separator includes an air outlet having an outlet housing that extends into the upper housing and defines a vertical air outlet passageway. The heater portion is disposed within the outlet housing and within the air outlet passageway. The upper housing defines a vertical axis. The heater portion can include heater windings that spiral around the vertical axis.

In a further implementation, the heater provides a majority of a thermal energy for roasting the batch of beans. The bean roasting system can also include an auxiliary heater that is physically separate from the cyclone separator.

In a yet further implementation, the bean roasting system also includes a controller coupled to the blower and the heater and other components of the bean roasting system. The controller is configured to operate the blower, the heater, and other components of the bean roasting system to provide a predetermined temperature profile in the roasting subsystem to roast the batch of beans.

In a second aspect of the disclosure, a method of manufacturing roasted beans includes providing and operating the bean roasting system as described.

DETAILED DESCRIPTION

Figure 1:
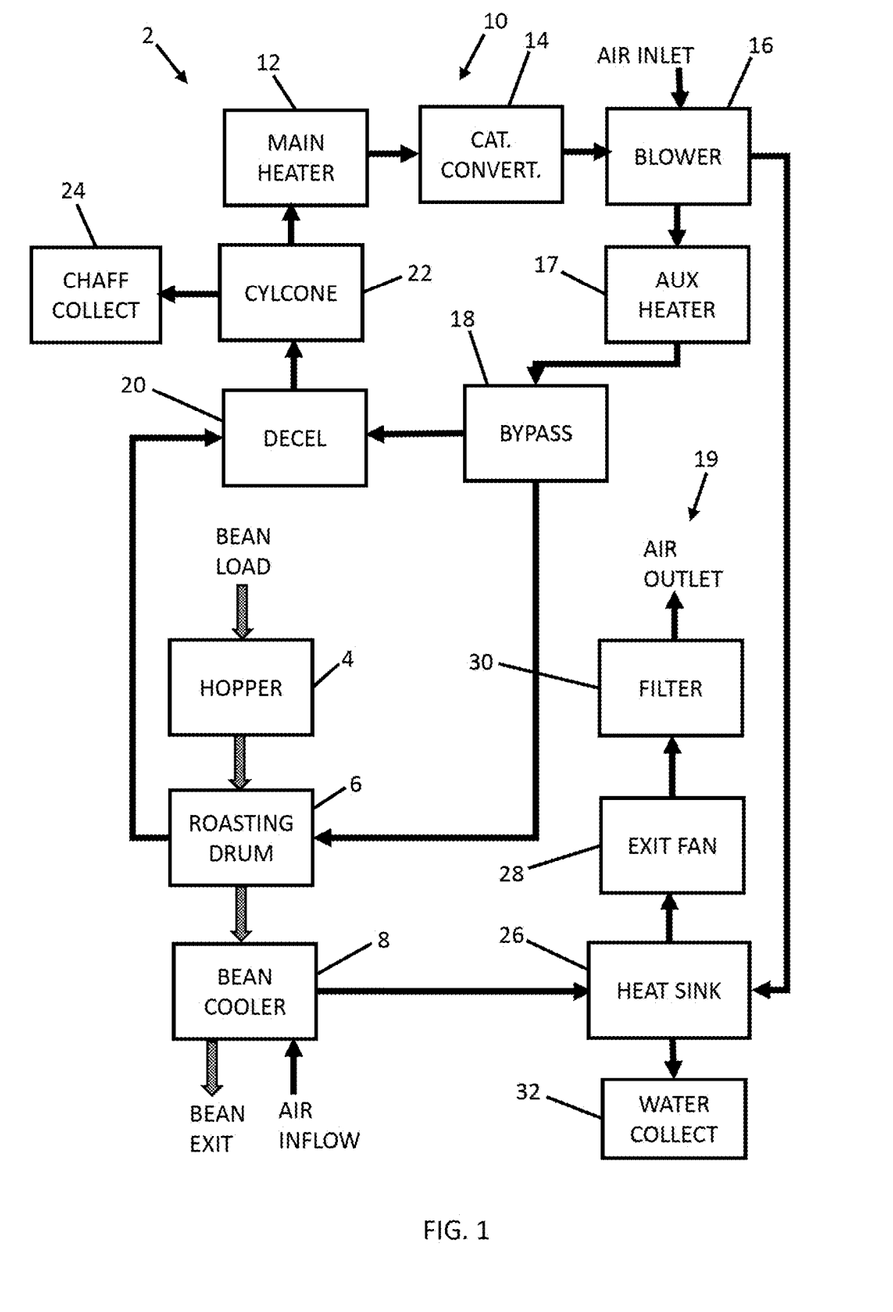

FIG. 1 is a schematic diagram of an embodiment of a roasting system 2. FIG. 1 discloses fluid paths between various functional elements. The fluid paths tend to conduct gaseous fluids such as air, water vapor, and gaseous emissions from beans being roasted or cooled. In addition, particulates from the roasting process can also be transmitted or entrained through the fluid paths. FIG. 1 also discloses a path for a batch of beans from a bean load to a bean exit.

Roasting system 2 includes a hopper 4 for loading and receiving a quantity or batch of unroasted beans. The hopper 4 feeds the unroasted beans into a roasting drum 6 or roasting subsystem 6 within which the batch of beans is heated and roasted, for example, according to a pre-programmed roasting process. Adjacent or below the roasting drum 6 is a bean cooling subsystem 8 or bean cooler 8 for receiving the batch of beans when they are in a just-roasted state (still hot), holding the batch of beans until they are cooled, and then dispensing the batch of beans into a receiving container such as a bag (not shown).

The roasting drum 6 is coupled to an air handling system 10 that includes a main heater 12, a catalytic converter 14, a blower 16, an auxiliary heater 17, a bypass 18, a velocity decelerator 20, a cyclone separator 22, and chaff collector 24. The air handling system 10 determines a temperature versus time roasting profile through controlled operation of the main heater 12, blower 16, auxiliary heater 17, bypass 18, and possibly other components of the air handling system 10. An air stream (indicated by arrows) recirculates through the air handling system 10. The air handling system 10 receives and removes particles and gaseous effluents emitted during the roasting process. The particles are captured by the cyclone 22, which deposits them in the chaff collector 24, which is periodically emptied. The gaseous effluents are collected by the catalytic converter 14.

The air handling system 10 defines two different branches or loops of air flow that are coupled by the bypass 18. One branch circulates from the bypass 18 to a decelerator 20, through the cyclone 22, main heater 12, catalytic converter 14, blower 16, and auxiliary heater 17, before returning to the bypass 18. Another branch passes from the bypass 18 to the roasting drum 6, to the decelerator 20, the cyclone 22, main heater 12, catalytic converter 14, blower 16, and auxiliary heater 17, before returning to bypass 18.

Part of an airstream generated by the blower 16 passes through an air exit subsystem 19 including a heat sink 26, an exit fan 28, and a filter 30 before being passed to environmental air (labeled as "air outlet" in FIG. 1). The heat sink 26 has the effect of condensing water vapor from the exit airstream as well as cooling the exit airstream. The condensed water vapor drips into a water collection receptacle 32. Replacement air (labeled "air inlet" in FIG. 1) from the environment air enters the blower 16. The overall effect is to remove water vapor from the air handling system 10 and to condense the water into the water collection receptacle 26.

The bean cooler 8 is also coupled to the air exit subsystem 19. The exit fan 28 therefore draws air out of the bean cooler 8 through the heat sink 26. This has the effect of accelerating cooling of the batch of beans.

Figure 2:
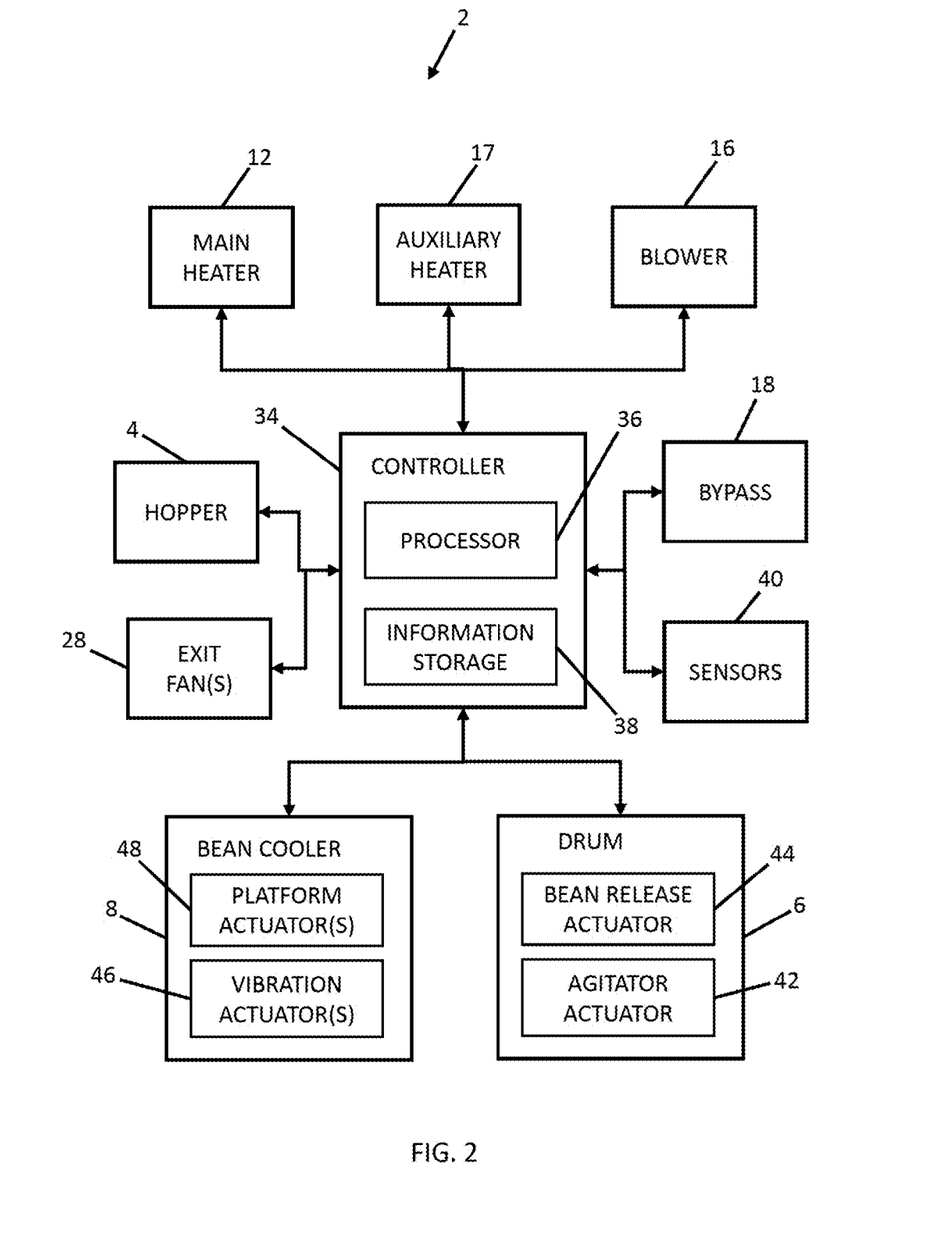

FIG. 2 is a simplified electrical block diagram of the roasting system 2. Relative to FIG. 1, like element numbers refer to like components. However, whereas FIG. 1 focuses on fluidics and the physical motion of beans, FIG. 2 focuses on electrical or wireless connections between components.

A controller 34 includes a processor 36 coupled to an information storage device 38. The information storage device 38 is a non-volatile or non-transient information storage device 38 that stores software instructions. When executed by the processor 36, the software instructions can control portions of the roasting system 2 that the controller 34 is configured to control. For example, the controller 34 can control any of the hopper 4, drum 6, bean cooler 8, main heater 12, blower 16, auxiliary heater 17, bypass 18, exit fan(s) 28, and other portions of the roasting system 2. The controller 34 can receive information form one or more sensors 40 for monitoring a status of portions of roasting system 2. The controller 34 is configured to control various actuators including an agitator actuator 42, a bean release actuator 44, a vibration actuator 46, and a platform actuator 48.

The agitator actuator 42 is configured to agitate the batch of beans within the drum 6 during the roasting process. The bean release actuator 44 is configured to release the batch of beans after roasting so that they can enter the bean cooler 8. The vibration actuator 46 is configured to vibrate the batch of beans and to enhance uniformity and rate of cooling of the batch of beans. The platform actuator 48 is configured to release the batch of beans after cooling to be dispensed into a container or bag.

In an embodiment, the agitator actuator 42 is configured to rotate an agitator. The agitator can include an agitator blade set supported by a central shaft. The agitator actuator can include a motor and a power coupling that couples the motor to the central shaft. The power coupling can include a gearbox and/or a belt that provides rotative coupling between the motor and the central shaft. In an embodiment, the bean release actuator 44 includes a pneumatic cylinder configured to open and close a hatch formed into a lower surface of the drum 6.

In an embodiment, the vibration actuator 46 can include a motor coupled to an elliptical cam or gear that couples to and shakes a cooling platform which in turn supports a batch of beans while cooling. In other embodiments the vibration actuator 46 can take other forms such as a motor with an elliptical weight or a piezoelectric transducer stack. In an embodiment, the platform actuator 48 can include one or more pneumatic cylinders configured to open and close an opening in the cooling platform.

Figure 3:
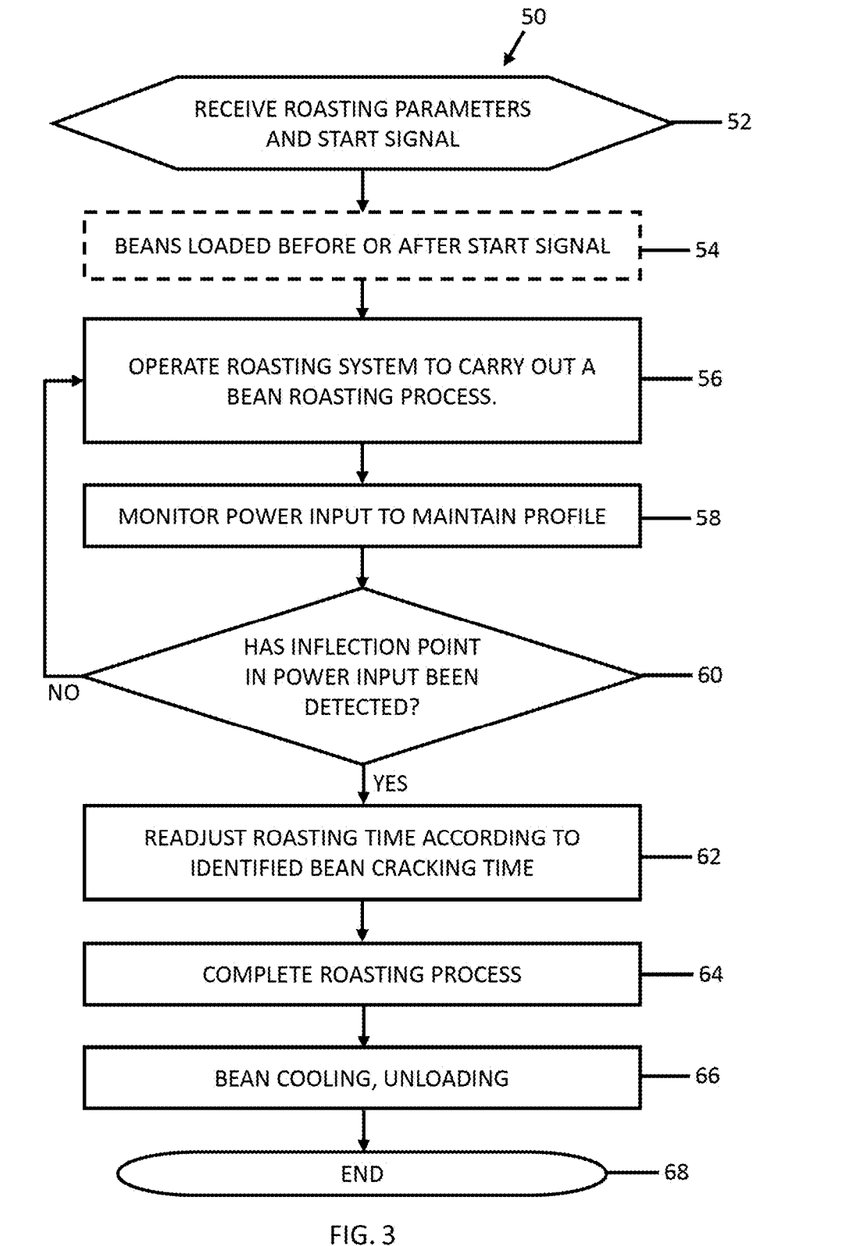
FIG. 3 is a flowchart of an embodiment of a roasting process for a batch of beans.

FIG. 3 is a flowchart of an embodiment of a roasting process 50 that is controlled by the controller 34. According to 52, controller 34 receives roasting parameters and a start signal. The roasting parameters can be indicative of a temperature-versus-time profile for roasting. The roasting parameters may also include a temperature profile before and after a bean cracking event is detected.

According to 54, a batch of beans is automatically or manually loaded into the hopper 4. Step 54 is showed in a dashed outline to highlight that it can be performed before or after step 52.

According to step 56, the roasting system 10 is operated to agitate and heat the batch of beans to begin and executing a bean roasting process. Executing the roasting process includes more particular processes including (1) operating the hopper to release the batch of beans into the drum, (2) operating the agitator actuator 42 to begin stirring and agitating the batch of beans, and (3) operating the air handling system 10 to heat the drum and to remove byproducts of the roasting process. The temperature in the drum ramps up and then stabilizes at a roasting temperature.

According to 58, a power used by the air handling system 10 to maintain the roasting temperature (by heating the drum) is monitored. The power is used to compensate for heat losses from the air handling system as well as a phase change that occurs as water is released from the batch of beans. The power usage will tend to be fairly stable and to drop during roasting initially. However, when the beans begin cracking, an exposure of water from within the beans will result in the air handling system 10 using more power to compensate for a phase change in the water from liquid to gaseous phase. The controller will then detect an increase in the power input in step 58. This increase in power is referred to as an "inflection point" in the monitored power level.

According to 60, detection of the inflection point in power level causes the process to proceed to step 62. Otherwise, the process loops back to steps 56 and 58 to continue to maintain the roasting temperature and monitor the input power.

Once the inflection point is determined, the controller 34 computes or determines a remaining temperature profile (temperature versus time) to complete the roasting process according to step 62. According to step 64, the controller applies the determined remaining temperature profile to the batch of beans.

According to 66, the controller controls the drum 6 and bean cooler 8 to cool and release the batch of beans. This ends at step 68 with the beans released into a container such as a bag.

Figure 4:
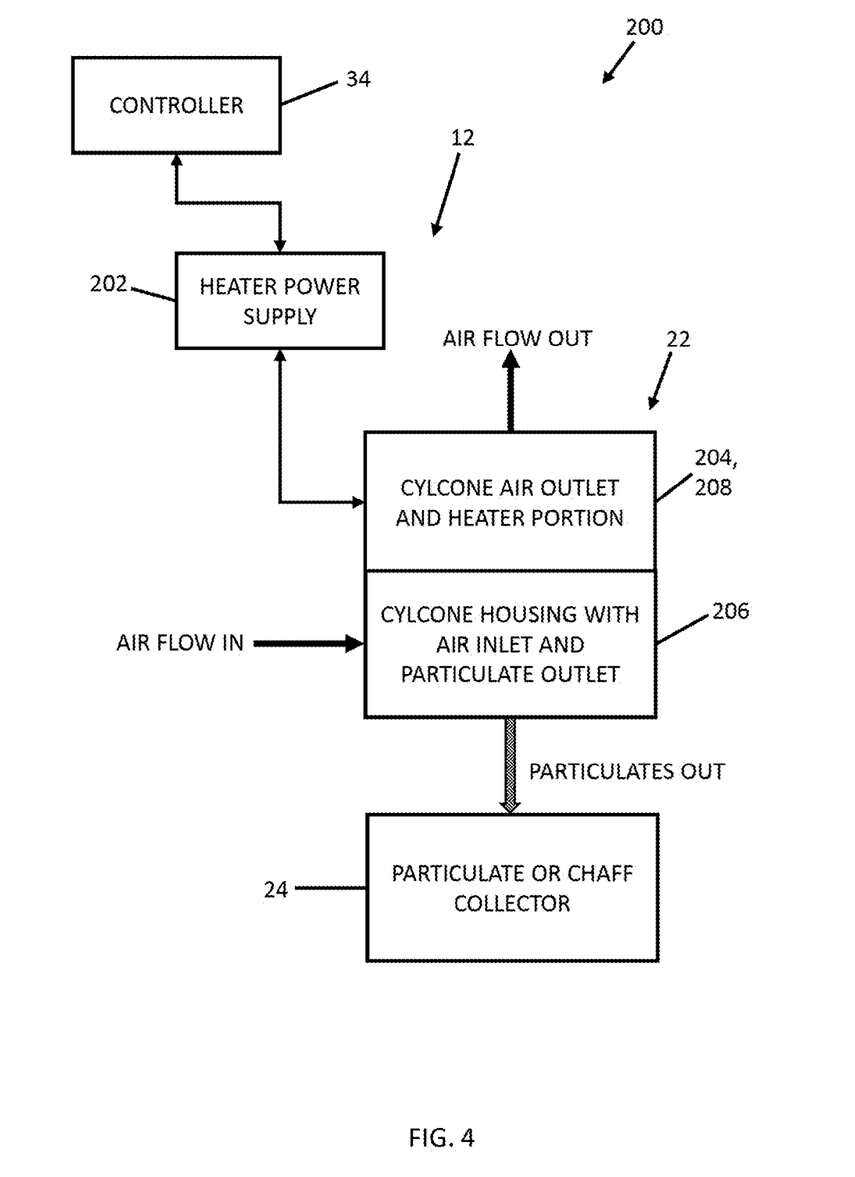
FIG. 4 is an is schematic representation of a portion of a roasting system with emphasis on a (main) heater and cyclone separator. The heater includes a heater power supply and heater windings. The heater windings include resistive heating coils for converting electrical energy into thermal energy. The heater windings are integrated with a portion of the cyclone separator.

FIG. 4 is a schematic representation of a portion 200 of the roasting system 2 with emphasis on the main heater 12 and cyclone separator 22. In the illustrated embodiment, the main heater 12 includes a heater power supply 202 coupled to heater portion or windings 204. The heater windings 204 include one or more coils of resistive material configured to convert electrical energy into thermal energy. Under control of controller 34, the heater power supply 202 is configured to apply electrical power to the heater windings 204, which increase in temperature and heat the cyclone separator 22 and air passing through the cyclone separator 22.

Figure 5A:
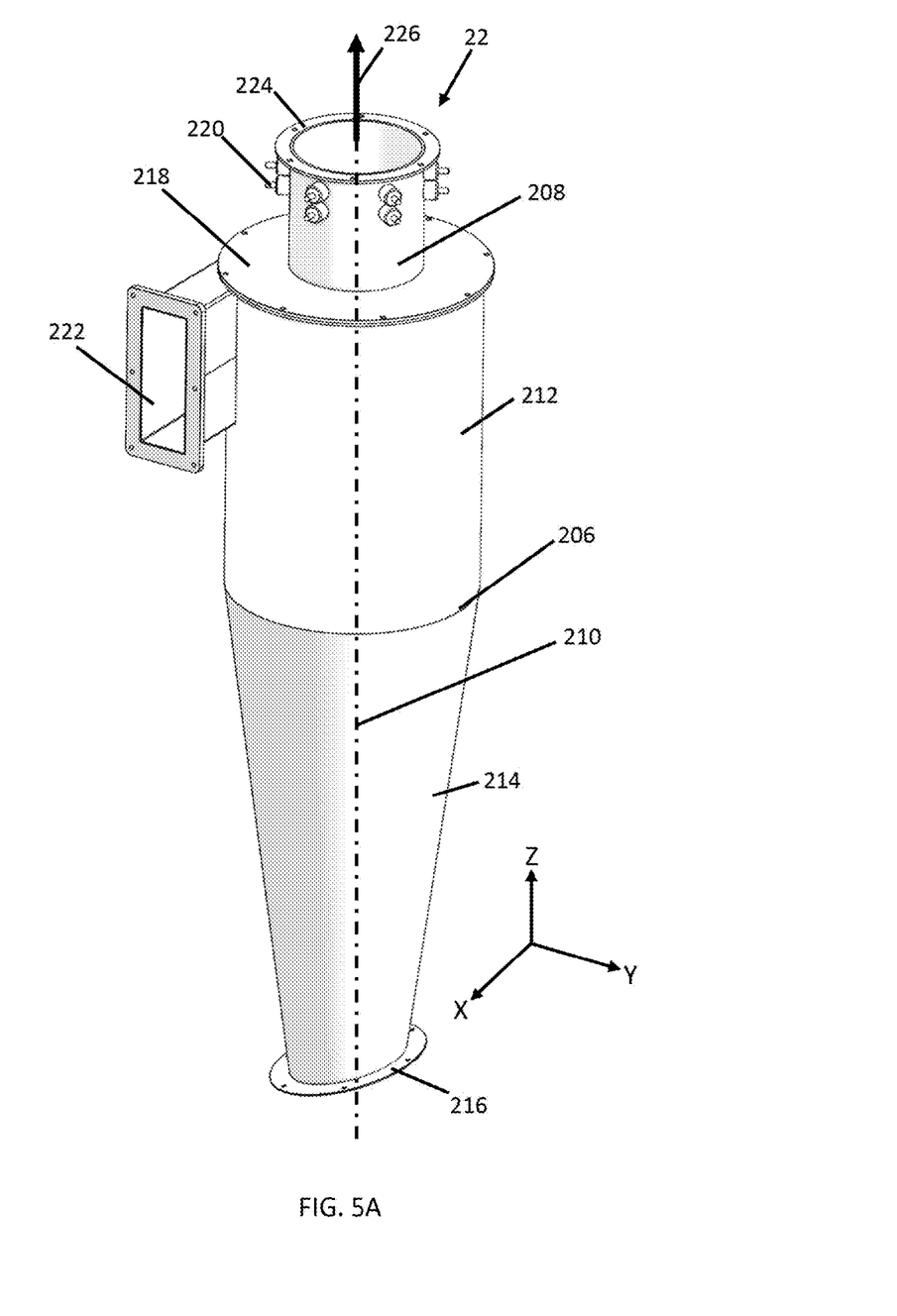
FIG. 5A is an isometric view of an example of a cyclone separator that includes integrated heater windings.
Figure 5B:
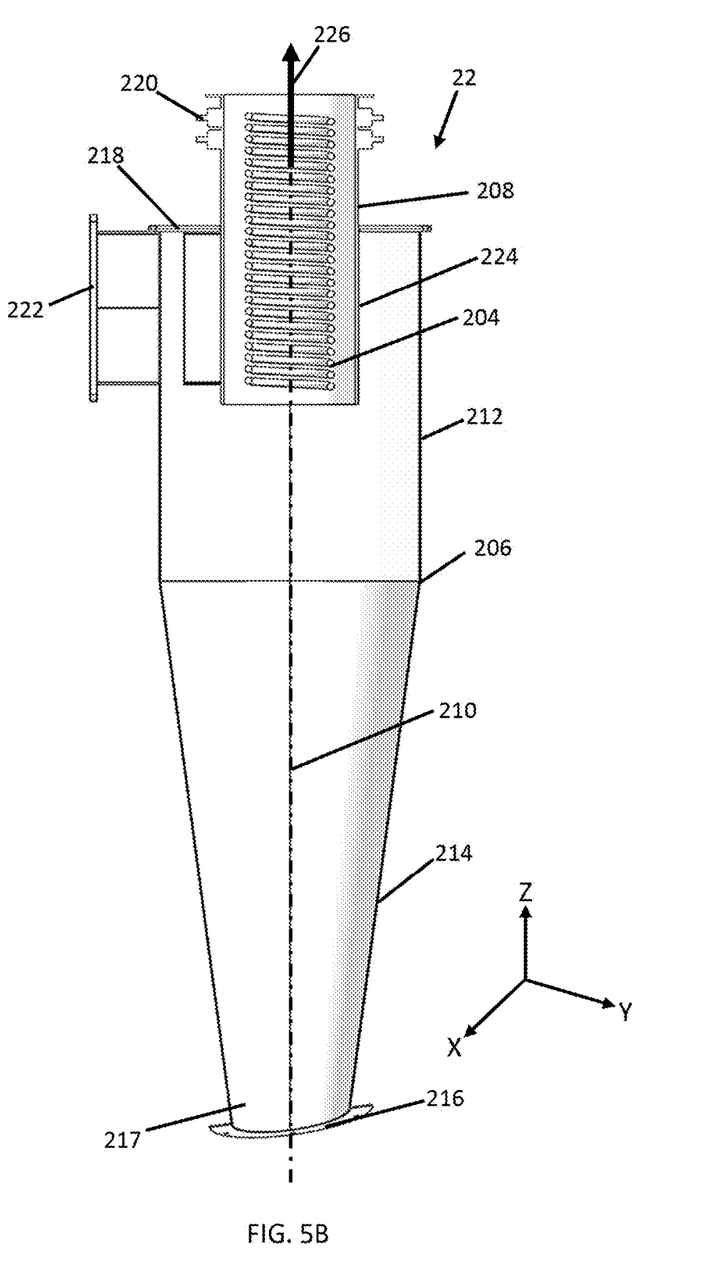
FIG. 5B is a sectional view of the cyclone separator of FIG. 5A that includes integrated heater windings.

In the illustrated embodiments of FIGS. 4, 5A, and 5B, the heater windings 204 are integrated with the cyclone separator 22. Stated another way, the heater windings 204 are physically supported and electrically isolated (isolated to avoid shorting between portions of the windings) within the cyclone separator 22. The cyclone separator 22 includes a cyclone housing 206 and an air outlet 208 that is coupled to the cyclone housing 206 and contains the heater windings 204.

FIGS. 5A and 5B are isometric and sectional views, respectively, of an example of the cyclone separator 22 in isolation. In the forgoing description, mutually orthogonal axes X, Y, and Z are used. The Z-axis is generally vertical and generally aligned with a gravitational reference. By "generally" it is by design but may vary according to manufacturing tolerances. The X-axis and Y-axis are generally horizontal and lateral.

The cyclone housing 206 defines a central axis 210 that is generally parallel to the Z-axis. Cyclone housing 206 includes a cylindrical upper housing 212 and a conical lower housing 214. The conical lower housing 214 tapers in a downward direction from the upper housing 212 to a particulate outlet 216. The upper housing 212 has an annular top 218. The air outlet 208 is generally cylindrical and extends through the annular top 218. A plurality of electrodes 220 extend radially out of the air outlet 208 and couple to the heater windings 204 and to the heater power supply 202 (shown in FIG. 4). The upper housing 212 also includes an air inlet 222.

In the illustrated embodiment, the central axis 210 is substantially common to the heater windings 204, air outlet 208, the upper housing 212, and the lower housing 214. The air outlet 208 includes a cylindrical housing 224 that extends from outside of the cyclone housing 206, through the annular top 218 and into the upper housing 212. The heater windings 204 are disposed inside the cylindrical housing 224 and likewise extend from outside of the cyclone housing 206, through the annular top 218 and into the upper housing 212. In other words, the heater windings 204 are disposed such that one portion of the heater windings 204 are disposed above the cyclone housing 206 and another portion of the heater windings 204 are disposed within the cyclone housing 206. The air outlet 208 defines a vertical air outlet flow path 226 for air being pumped from the air outlet 208 to the blower 16 (shown in FIG. 1). The heater windings 204 are helically disposed within the cylindrical housing 224 and within the air outlet flow path 226.

During a roasting operation, air from the roasting drum 6 enters the air inlet 222 along a direction that is substantially or nearly tangential to the circular and cylindrical geometry of the upper housing 212. Alternatively, the air from the roasting drum 6 can enter the air inlet 222 generally along another vector and then be redirected as to be nearly tangential to the circular and cylindrical geometry of the upper housing. During use, the air is laden with particulates from the roasting process. The particulates circulate in a downward spiral as they lose velocity and fall toward the particulate outlet 216. The particulates exit the particulate outlet 216 and fall into the chaff collector 24 (shown in FIG. 1). The downward spiral of the particulate trajectory is along an inside conical surface of the lower housing 214 and tends to be about the vertical axis 210. The conical surface of the lower housing 214 is configured to direct a spiral movement of the particulates from the upper housing 212 to the particulate outlet 216 at a lower end portion 217 of the lower housing 214.

Locating (or disposing or integrating) the heater windings 204 within the interior of the air outlet 208 has various advantages including thermal efficiency and compactness. The addition of the heater windings 204 have a negligible impact on the size of the cyclone separator 22. Moreover, the heater windings 204 convectively heat the cylindrical housing 224 and upper housing 212, which increases a metallic surface area in contact with a stream of air along the air outlet flow path 226 that exits the cyclone separator 22. As a result, there is a very effective convective heat transfer of thermal energy from the heater windings 204 to air that passes out of the air outlet 208.

Figure 6:
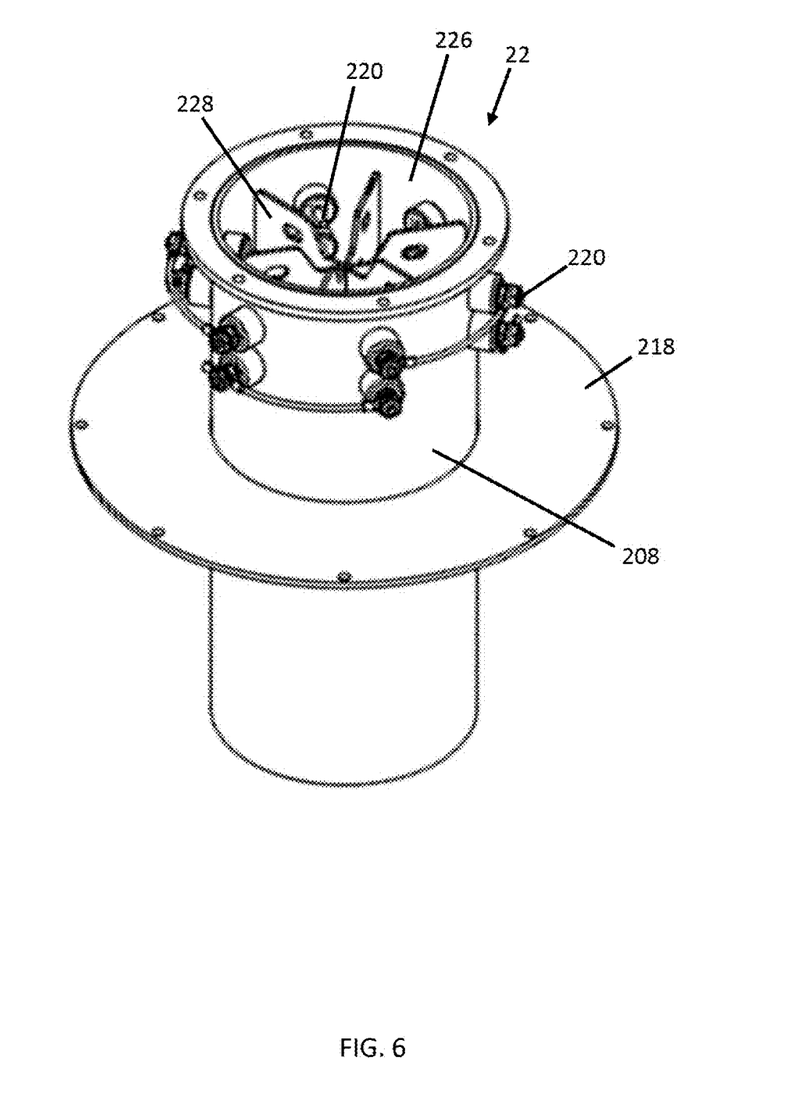
FIG. 6 is an isometric view of a portion of the cyclone separator of FIG. 5A with emphasis on electrodes and insulating substrates that support and isolate the heater windings.

The illustration of the heater windings 204 within the air outlet 208 is schematic in nature. FIG. 6 is an isometric drawing of a portion a particular embodiment of the cyclone separator 22. The illustrated embodiment includes six pairs of electrodes 220 that extend from an outside cylindrical surface of the air outlet 208 to within the air outlet flow path 226, which is a cylindrical space within the air outlet 208. (Although some of electrodes 220 are only partially visible and others of electrodes 220 are not visible in FIG. 6, it should be understood that each electrode 220 is partially disposed outside of air outlet 208 and partially disposed inside of air outlet 208.) Within the air outlet flow path 226 are three intersecting insulating substrates 228. The heater windings 204 (not shown in FIG. 6) include a plurality of helical coils that extend from the electrodes 220 and are supported by the insulating substrates 228. More specifically, each insulating substrate 228 has multiple holes that are in a substantially vertical arrangement and that are located to receive a portion of a heater winding from the heater windings 204. Collectively, the insulating substrates 228 provide a support for and maintain a proper spacing and physical separation of the helical coils of the heater windings 204. This maximizes (or at least improves) convective heat transfer from the heater windings 204 to an air stream passing through the air outlet 208 and prevents shorting between the heater windings 204.

While a particular embodiment of a heater 12 is shown in FIGS. 4, 5A, 5B, and 6, alternative embodiments of heater 12 can be used. As a first alternative embodiment, heater 12 can include a plasma generator configured to generate a plasma within the air outlet flow path 226. As a second alternative embodiment, heater 12 can include a natural gas jet device that emits a flame into the air outlet flow path 226. Therefore, the "heater portion" of heater 12 can include one or more of a plasma emitter, a gas jet flame, resistive heater windings, and other heating devices that are configured to heat air passing through the air outlet flow path 226 of the air outlet 208.

The specific embodiments and applications thereof described above are for illustrative purposes only and do not preclude modifications and variations encompassed by the scope of the following claims.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules (e.g., a controller) may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" (or "information storage") should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

What is claimed:

1. A bean roasting system, comprising:
   a roasting subsystem configured to receive and to thermally roast a batch of beans; and
   an air handling subsystem coupled to the roasting subsystem, the air handling subsystem including:
   a blower configured to impart motion to air to pass the air through at least a portion of the air handling subsystem; and
   a cyclone separator configured to remove particulates, the cyclone separator including a heater configured to heat the air passing through at least a portion of the air handling subsystem, the heater including a heater portion configured to generate heat and disposed within an upper housing of the cyclone separator.

2. The bean roasting system of claim 1, wherein:
   the cyclone separator includes an air outlet that extends into the upper housing of the cyclone separator, an air inlet, and a particulate outlet disposed in a lower housing of the cyclone separator, the air outlet defining a portion of a flow path through which the air passes from the cyclone separator towards the blower, the heater portion is at least partially disposed within the air outlet.

3. The bean roasting system of claim 1, wherein:
   the cyclone separator has a vertical cyclone axis that is substantially central, during operation of the bean roasting system, to a spiral rotation of particulates as they pass from an upper portion of the cyclone separator to a particulate outlet of the cyclone separator,
   the heater portion includes heater windings that surround a portion of the vertical cyclone axis.

4. The bean roasting system of claim 1, wherein the cyclone separator includes a cyclone housing including the upper housing and a lower housing, the heater portion extends vertically from above the upper housing into the upper housing.

5. The bean roasting system of claim 1, wherein the cyclone separator includes an air outlet, the air outlet having an outlet housing that extends into the upper housing and defines a vertical air outlet flow path, the heater portion includes heater windings that are disposed within the vertical air outlet flow path.

6. The bean roasting system of claim 5, wherein the air passes through the vertical air outlet flow path from the cyclone separator towards the blower, the heater portion is positioned within the vertical air outlet flow path to heat air that passes through the vertical air outlet flow path.

7. The bean roasting system of claim 1, wherein the upper housing defines a vertical axis, the heater portion includes heater windings that are disposed within an air outlet and that spiral around the vertical axis.

8. The bean roasting system of claim 1, wherein the heater is configured to provide a majority of a thermal energy for roasting the batch of beans.

9. The bean roasting system of claim 1, wherein the air handling subsystem defines, during operation of the bean roasting system, at least one air flow loop that passes from the cyclone separator to the blower to the roasting subsystem, and back to the cyclone separator, the air flow loop passes through the heater portion of the cyclone separator.

10. The bean roasting system of claim 1, further comprising a controller coupled to the blower and the heater, the controller configured to operate at least the blower and the heater to provide a predetermined temperature profile in the roasting subsystem to roast the batch of beans.

11. A bean roasting system, comprising:
a roasting drum configured to receive and to thermally roast a batch of beans; and
a blower fluidically coupled to the roasting drum and configured to impart motion to air to pass the air through a flow path within the bean roasting system; and
a cyclone separator fluidically coupled to the roasting drum and configured to remove particulates within at least a portion of the flow path,
the cyclone separator including a heater and an air outlet defining at least a portion of the flow path, the heater including a heater portion that is disposed within the air outlet of the cyclone separator and configured to generate heat to heat the air passing through the at least the portion of the flow path defined by the air outlet.

12. The bean roasting system of claim 11, wherein:
the at least the portion of the flow path defined by the air outlet includes a vertical air outlet flow path,
the heater portion is disposed within the vertical air outlet flow path.

13. The bean roasting system of claim 11, wherein:
the cyclone separator has a vertical cyclone axis that is substantially central, during operation of the bean roasting system, to a spiral rotation of particulates as they pass from an upper portion of the cyclone separator to a particulate outlet of the cyclone separator,
the heater portion includes heater windings that surround a portion of the vertical cyclone axis.

14. The bean roasting system of claim 11, wherein the cyclone separator includes a cyclone housing including an upper housing and a lower housing, the heater portion extends vertically from above the upper housing into the upper housing.

15. The bean roasting system of claim 14, wherein the air outlet has an outlet housing that extends into the upper housing and defines a vertical air outlet flow path, the vertical air outlet flow path included in the at least the portion of the flow path defined by the air outlet, the heater portion includes heater windings that are disposed within the vertical air outlet flow path.

16. The bean roasting system of claim 14, wherein the upper housing is generally cylindrical and the lower housing is generally conical and configured to direct a spiral movement of the particulates from the upper housing to a particulate outlet at a lower end portion of the lower housing.

17. The bean roasting system of claim 14, wherein:
the air outlet has an outlet housing that extends into the upper housing and defines a vertical air outlet flow path, the heater portion includes heater windings that are disposed within the vertical air outlet flow path,
the upper housing defines a vertical axis, the heater windings spiral around the vertical axis.

18. The bean roasting system of claim 11, wherein the heater is configured to provide a majority of a thermal energy for roasting the batch of beans.

19. The bean roasting system of claim 11, further comprising:
a bypass fluidically coupled to the blower, the roasting drum and the cyclone separator, the bypass configured to define, during operation of the bean roasting system, at least one air flow loop that passes from the cyclone separator to the blower to the roasting drum, and back to the cyclone separator.

20. The bean roasting system of claim 11, further comprising a controller coupled to the blower and the heater, the controller configured to operate at least the blower and the heater to provide a predetermined temperature profile in the roasting drum to roast the batch of beans.

* * * * *